(12) United States Patent
Seo

(10) Patent No.: US 8,884,917 B2
(45) Date of Patent: Nov. 11, 2014

(54) APPARATUS AND METHOD FOR DRIVING TOUCH SENSOR

(75) Inventor: Seong-Mo Seo, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 337 days.

(21) Appl. No.: 13/337,366

(22) Filed: Dec. 27, 2011

(65) Prior Publication Data

US 2012/0169660 A1    Jul. 5, 2012

(30) Foreign Application Priority Data

Dec. 31, 2010  (KR) .......................... 10-2010-0140249
Dec. 31, 2010  (KR) .......................... 10-2010-0140250

(51) Int. Cl.
*G06F 3/045*     (2006.01)
*G06F 3/044*     (2006.01)
*G06F 1/32*      (2006.01)
*G06F 3/041*     (2006.01)

(52) U.S. Cl.
CPC .............. *G06F 3/044* (2013.01); *G06F 1/3262* (2013.01); *G06F 3/0416* (2013.01)
USPC ........................................................ 345/174

(58) Field of Classification Search
CPC ................ G06F 3/03547; G06F 3/041–3/047; G06F 2203/04104; G06F 2203/04106
USPC ..................... 345/173–178; 178/18.01–18.11
See application file for complete search history.

(56) References Cited

U.S. PATENT DOCUMENTS

| | | | | |
|---|---|---|---|---|
| 7,812,827 | B2 * | 10/2010 | Hotelling et al. | 345/173 |
| 2007/0229468 | A1 * | 10/2007 | Peng et al. | 345/173 |
| 2008/0277171 | A1 * | 11/2008 | Wright | 178/18.06 |
| 2010/0039406 | A1 | 2/2010 | Lee et al. | |
| 2010/0156805 | A1 * | 6/2010 | Brand et al. | 345/173 |
| 2011/0157068 | A1 * | 6/2011 | Parker et al. | 345/174 |

FOREIGN PATENT DOCUMENTS

| | | |
|---|---|---|
| CN | 101221479 A | 7/2008 |
| CN | 101339475 A | 1/2009 |
| CN | 101615097 A | 12/2009 |
| CN | 101634914 A | 1/2010 |
| CN | 101644980 A | 2/2010 |
| JP | 2005-337773 A | 12/2005 |

(Continued)

OTHER PUBLICATIONS

Taiwan Office Action issued in Taiwanese Patent Application No.: 100148465 on May 12, 2014.

(Continued)

*Primary Examiner* — Liliana Cerullo
(74) *Attorney, Agent, or Firm* — Morgan, Lewis & Bockius LLP

(57) ABSTRACT

Disclosed is an apparatus and method for driving a touch sensor in which a group sensing method per region or a local channel sensing method in a selected region is used depending upon whether touch is made, thereby reducing touch calculation time and power consumption. An apparatus for driving a touch sensor, including a plurality of first conduction lines and a plurality of second conduction lines, includes a touch controller to divide the touch sensor into a plurality of regions, to periodically sense whether touch has been made per region using a group sensing mode, to select a touch region when the touch region is detected, and to sense whether touch has been made per channel using a channel sensing mode only in the selected region.

5 Claims, 11 Drawing Sheets

(56) References Cited

FOREIGN PATENT DOCUMENTS

| | | |
|---|---|---|
| JP | 4435622 A | 3/2010 |
| TW | 576530 | 2/2004 |
| TW | I258687 B | 7/2006 |
| TW | 200941314 A1 | 10/2009 |
| TW | 200945155 A1 | 11/2009 |

OTHER PUBLICATIONS

Chinese Office Action issued in Chinese Patent Application no. 201110461221.5 on Jul. 3, 2014.

* cited by examiner

APPARATUS AND METHOD FOR DRIVING TOUCH SENSOR

This application claims the benefit of Korean Patent Applications No. 10-2010-0140249 and No. 10-2010-0140250, filed on Dec. 31, 2010, which are hereby incorporated by reference as if fully set forth herein.

BACKGROUND OF THE INVENTION

1. Field of the Invention

The present invention relates to a touch sensor drive system, and more particularly, to an apparatus and method for driving a touch sensor that is capable of reducing touch calculation time and power consumption.

2. Discussion of the Related Art

In recent years, a touch sensor (touchscreen, touch panel) enabling information to be input on screens of various display devices by touch has been widely used as an information input device of a computer system. Users can move and select displayed information simply by touching a screen using a finger or stylus, and therefore, people of all ages and both sexes can easily use such a touch sensor.

The touch sensor senses a position at which touch is generated on the screen of a display device and outputs touch information. A computer system analyzes the touch information and executes a command. A flat display device, such as a liquid crystal display device, a plasma display panel and an organic light emitting diode display device, is mainly used as the display device.

Based on sensing principles, the touch sensor is classified as a capacitive type, a photo type, an infrared type, an ultrasonic type or an electromagnetic type touch sensor. The touch sensor may be an on-cell touch sensor which is manufactured in the form of a panel and attached to the top of a display device or an in-cell touch sensor incorporated in a pixel matrix of the display device. A photo touch sensor to sense touch based on photo intensity using a photo transistor and a capacitive touch sensor to recognize touch based on capacitive variation are most commonly used as the touch sensor.

Generally, the touch sensor includes a plurality of first conduction lines to supply drive signals from a touch controller and a plurality of second conduction lines to output readout signals indicating whether touch has been made. The touch controller sequentially senses readout signals output from the second conduction lines, while sequentially driving the first conduction lines, to determine whether touch has been made.

On the other hand, a conventional touch controller calculates readout signals output from the second conduction lines per channel using a touch algorithm, while periodically scanning all of the first conduction lines of the touch sensor per channel irrespective of the number of touch points, to determine whether touch has been made. In the conventional touch sensor, therefore, the entirety of the touch sensor is scanned per channel even when no touch point is generated or only one touch point is generated, and touch algorithm calculation is performed per channel to sense whether touch has been made. As a result, reduction of touch calculation time and power consumption is limited due to unnecessary touch calculation time. As the size of the touch sensor increases, touch calculation time and power consumption also increase.

A host computer analyzes touch information sensed by the touch controller and executes a corresponding command. Also, if touch is not continuously generated on the touch sensor, and therefore, touch information from the touch controller is not input to the host computer within a predetermined time, the host computer switches the touch controller to a power save mode, thereby reducing power consumption.

Even in the power save mode, however, the conventional touch controller calculates readout signals output from readout lines per channel using a touch algorithm, while periodically scanning all of the scan lines of the touch sensor per channel, to determine whether touch has been made. Even in the power save mode, therefore, the conventional touch controller performs touch algorithm calculation per channel, while scanning the entire region of the touch sensor per channel, to sense whether touch has been made. For this reason, reduction of power consumption of the conventional touch controller is limited.

SUMMARY OF THE INVENTION

Accordingly, the present invention is directed to an apparatus and method for driving a touch sensor that substantially obviates one or more problems due to limitations and disadvantages of the related art.

An object of the present invention is to provide an apparatus and method for driving a touch sensor in which a group sensing method per region or a local channel sensing method in a selected region is used depending upon whether touch is made, thereby reducing touch calculation time and power consumption.

Another object of the present invention is to provide an apparatus and method for driving a touch sensor in which per-region group sensing is used in a power save mode, thereby reducing power consumption.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for driving a touch sensor including a plurality of first conduction lines and a plurality of second conduction lines includes a touch controller to divide the touch sensor into a plurality of regions, to periodically sense whether touch has been made per region using a group sensing mode, to select a touch region when the touch region is detected, and to sense whether touch has been made per channel using a channel sensing mode only in the selected region.

The touch controller may use a group self-sensing mode in which the first conduction lines and second conduction lines are grouped per region to sense self-capacitance variation per region or a group mutual sensing mode to sense mutual-capacitance variation per region as the group sensing mode, and the touch controller may use a channel mutual sensing mode to sense mutual-capacitance variation per channel in the selected region as the channel sensing mode in the selected region.

The touch controller may include a first self mode block to drive the first conduction lines in the group self-sensing mode, a first mutual mode block to drive the first conduction lines in the group mutual sensing mode and in the channel mutual sensing mode in the selected region, a first mode switching block to connect the first self mode block or the first mutual mode block to the first conduction lines according to the sensing mode, a second self mode block to drive the second conduction lines in the group self-sensing mode, a second mutual mode block to drive the second conduction lines in the group mutual sensing mode and in the channel mutual sensing mode in the selected region, a second mode switching block to connect the second self mode block or the second mutual mode block to the second conduction lines according to the sensing mode, and a microcontroller unit to control the first and second self mode blocks, the first and second mutual mode blocks and the first and second mode switching blocks.

The first self mode block may include a first drive signal generator to generate and output signals to drive the first conduction lines, a first grouping switch block to group the first conduction lines connected through the first mode switching block per region according to group self-sensing mode control of the microcontroller unit, and a first self-sensing unit connected to an output line of the first drive signal generator via a feedback line to sense self-capacitance variation of the first conduction lines grouped per region.

The second self mode block may include a second drive signal generator to generate and output signals to drive the second conduction lines, a second grouping switch block to group the second conduction lines connected through the second mode switching block per region according to group self-sensing mode control of the microcontroller unit, and a second self-sensing unit connected to an output line of the second drive signal generator via a feedback line to sense self-capacitance variation of the second conduction lines grouped per region.

The first mutual mode block may include a third drive signal generator to generate and output signals to drive the first conduction lines, a first channel switching block connected in common to the third drive signal generator and connected to the first conduction lines connected through the first mode switching block per channel to selectively switch the drive signals per channel according to the group mutual mode or channel mutual mode control of the microcontroller unit, a third grouping switch block connected between the first channel switching block and the first mode switching block to group the first conduction lines connected through the first mode switching block per region according to the group mutual mode control of the microcontroller unit, a first mutual sensing unit to sense mutual-capacitance variation of the first conduction lines grouped per region, and a first transmitting and receiving switching block connected between the third drive signal generator and the first channel switching block and between the first mutual sensing unit and the first channel switching block to connect an end of the first channel switching block to an output end of the third drive signal generator or to an input end of the first mutual sensing unit according to transmitting and receiving mode control of the microcontroller unit.

The second mutual mode block may include a fourth drive signal generator to generate and output signals to drive the second conduction lines, a second channel switching block connected in common to the fourth drive signal generator and connected to the second conduction lines connected through the second mode switching block per channel to switch the drive signals per channel according to the group mutual mode or channel mutual mode control of the microcontroller unit, a fourth grouping switch block connected between the second channel switching block and the second mode switching block to group the second conduction lines connected through the second mode switching block per region according to the group mutual mode control of the microcontroller unit, a second mutual sensing unit to sense mutual-capacitance variation of the second conduction lines grouped per region, and a second transmitting and receiving switching block connected between the fourth drive signal generator and the second channel switching block and between the second mutual sensing unit and the second channel switching block to connect an end of the second channel switching block to an output end of the fourth drive signal generator or to an input end of the second mutual sensing unit according to transmitting and receiving mode control of the microcontroller unit.

In another aspect of the present invention, a method of driving a touch sensor including a plurality of first conduction lines and a plurality of second conduction lines includes dividing the touch sensor into a plurality of regions and periodically sensing whether touch has been made per region using a group sensing mode, selecting a touch region when the touch region is detected, and sensing whether touch has been made per channel using a channel sensing mode only in the selected region.

In another aspect of the present invention, an apparatus for driving a touch sensor including a plurality of scan lines and a plurality of readout lines includes a touch controller to divide the touch sensor into a plurality of regions, to sense whether touch has been made per region by grouping and scanning scan lines in each region and grouping readout lines in a corresponding region, and to periodically repeat group scanning and group sensing per region in a power save mode.

The touch controller may select a touch region when the touch region is detected through the group scanning and group sensing per region, may perform scanning of scan lines in the selected region per channel and may read readout signals from readout lines in the selected region per channel to sense whether touch has been made per channel only in the selected region.

The touch controller may include a drive signal generator to generate and output drive signals to drive the touch sensor, a touch drive circuit to group the scan lines per region, to supply the drive signals supplied from the drive signal generator to the grouped scan lines, and to supply the drive signals to the scan lines in the selected region per channel, a readout circuit to group the readout lines per region, to sense whether touch has been made per region by outputting readout signals from the grouped readout lines, and to sense whether touch has been made per channel by outputting readout signals output from the readout lines in the selected region per channel, and a microcontroller unit to control per-region scanning of the touch drive circuit and per-channel scanning of the touch drive circuit in the selected region, to control per-channel sensing and per-region group sensing scanning of the readout circuit, and to select the touch region or calculate touch coordinates using sensed data supplied from the readout circuit.

The touch drive circuit may include a plurality of scan switches connected to the scan lines per channel and connected in common to the drive signal generator to switch the drive signals per channel under control of the microcontroller unit, and a plurality of scan grouping switches connected between the scan lines in each region to group the scan lines in each region under control of the microcontroller unit.

When the touch region is selected in the power save mode, the scan switches in the selected region may be sequentially switched per channel under control of the microcontroller unit, the scan switches may be sequentially switched per channel under control of the microcontroller unit in a sensing mode different from the power save mode, and, when the scan switches are switched per channel, all of the scan grouping switches may be turned off under control of the microcontroller unit.

The readout circuit may include a plurality of readout switches connected to the readout lines per channel so that the readout switches are switched per channel under control of the microcontroller unit to output readout signals supplied from the readout lines in the selected region per channel, a plurality of readout grouping switches connected between readout lines in each region to group the readout lines in each region under control of the microcontroller unit, and a sensing unit to sense whether touch has been made from the readout signals supplied per channel or per region through the readout switches.

When the touch region is selected in the power save mode, the readout switches in the selected region may be sequentially switched per channel under control of the microcontroller unit, the readout switches may be sequentially switched per channel under control of the microcontroller unit in a sensing mode different from the power save mode, and, when the readout switches are switched per channel, all of the readout grouping switches may be turned off under control of the microcontroller unit.

In a further aspect of the present invention, a method of driving a touch sensor including a plurality of scan lines and a plurality of readout lines includes, in a power save mode, dividing the touch sensor into a plurality of regions and sensing whether touch has been made per region by grouping and scanning scan lines in each region and grouping readout lines in a corresponding region, and periodically repeating group scanning and group sensing per region.

The method may further include determining whether a touch region has been detected using the sensed data, maintaining the power save mode if the touch region has not been detected, selecting the touch region if the touch region has been detected, and scanning scan lines in the selected region per channel and reading readout signals from readout lines in the selected region per channel to sense whether touch has been made per channel only in the selected region.

The method may further include generating and outputting drive signals to drive the touch sensor, wherein the group scanning and group sensing per region may include grouping the scan lines per region and supplying the drive signals to the grouped scan lines, and grouping the readout lines per region and outputting readout signals from the grouped readout lines to sense whether the touch has been made per region.

The scanning and sensing per channel in the selected region may include sequentially supplying the drive signals to the scan lines in the selected region per channel, and sequentially reading readout signals per channel from the readout lines in the selected region to sense whether touch has been made.

The method may further include, in a sensing mode different from the power save mode, sequentially scanning the scan lines per channel and reading readout signals per channel from the readout lines in the selected region to sense whether touch has been made per channel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
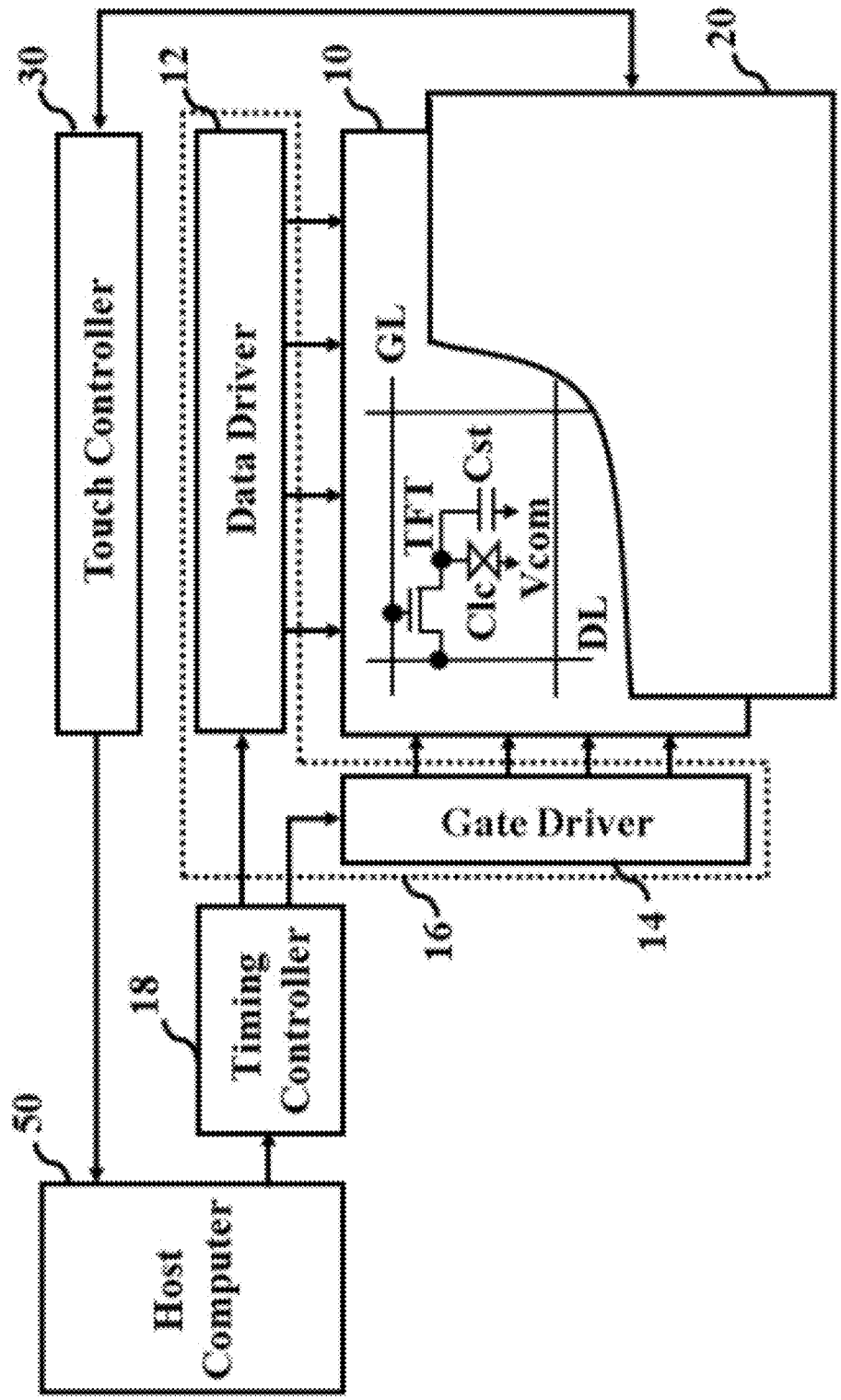
FIG. 1 is a circuit block diagram schematically showing the construction of a display device including a touch sensor drive apparatus according to an embodiment of the present invention.

FIG. 1 is a block diagram showing the construction of a display device including a touch sensor drive apparatus according to an embodiment of the present invention.

Referring to FIG. 1, the display device includes a display panel 10, a panel drive unit 16 including a data driver 12 and gate driver 14 to drive the display panel 10, a timing controller 18 to control the panel drive unit 16, a touch sensor 20 disposed on the display panel 10, and a touch controller 30 to drive the touch sensor 20. The timing controller 18 and the touch controller 30 are connected to a host computer 50.

The timing controller 18 and the data driver 12 may be individually integrated into integrated circuits (ICs), respectively, or the timing controller 18 may be incorporated in the data driver 12 to be integrated into a single IC. Also, the touch controller 30 and the timing controller 18 may be individually integrated into ICs, respectively, or the touch controller 30 may be incorporated in the timing controller 18 to be integrated into a single IC.

The display panel 10 includes a pixel array in which a plurality of pixels is arranged. The pixel array displays a graphical user interface (GUI) including a pointer or cursor and other images. A flat display panel, such as a liquid crystal display panel (hereinafter, referred to as a liquid crystal panel), a plasma display panel and an organic light emitting diode display panel, may be used as the display panel 10. Hereinafter, a liquid crystal panel will be described as an example.

In a case in which a liquid crystal panel is used as the display panel 10, the display panel 10 includes a color filter board in which a color filter array is formed, a thin film transistor board in which a thin film transistor array is formed, a liquid crystal layer disposed between the color filter board and the thin film transistor board, and polarizing plates attached to the outsides of the color filter board and the thin film transistor board. The display panel 10 displays an image through a pixel matrix in which a plurality of pixels is arranged. Each pixel realizes a desired color through a combination of red, green and blue sub pixels to adjust light transmissivity based on variation of liquid crystal arrangement according to a data signal. Each sub pixel includes a thin film transistor TFT connected to a gate line GL and data line DL, and a liquid crystal capacitor Clc and storage capacitor Cst connected in parallel to the thin film transistor TFT. The liquid crystal capacitor Clc charges difference voltage between a data signal supplied to a pixel electrode through the thin film transistor TFT and common voltage Vcom supplied to a common electrode and drives liquid crystals according to the charged voltage to adjust light transmissivity. The storage capacitor Cst stably maintains the voltages charged in the liquid crystal capacitor Clc. The liquid crystal layer may be driven by a vertical electric field, such as a twisted nematic (TN) mode or vertical alignment (VA) mode electric field, or by a horizontal electric field, such as an in-plane switching (IPS) mode or fringe field switching (FFS) mode electric field.

The data driver 12 supplies image data from the timing controller 18 to a plurality of data lines DL of the display panel 10 in response to a data control signal from the timing controller 18. The data driver 12 converts digital data input from the timing controller 18 into a positive/negative polarity analog data signal using gamma voltage and supplies the data signal to the data lines DL whenever the respective gate lines GL are driven. The data driver 12 may be composed of at least one data IC, may be mounted at a circuit film, such as a tape carrier package (TCP), a chip on film (COF) or a flexible printed circuit (FPC), and may be attached to the display panel 10 using a tape automatic bonding (TAB) method or mounted on the display panel 10 using a chip on glass (COG) method.

The gate driver 14 sequentially drives a plurality of gate lines GL formed in the thin film transistor array of the display panel 10 in response to a gate control signal from the timing controller 18. The gate driver 14 supplies a scan pulse of gate one voltage during a corresponding scanning period of each gate line GL and supplies gate off voltage during the remaining period in which the other gate lines GL are driven. The gate driver 14 may be composed of at least one gate IC, may be mounted at a circuit film, such as a TCP, a COF or an FPC, and may be attached to the display panel 10 using a TAB method or mounted on the display panel using a COG method. Also, the gate driver 14 may be incorporated in a display panel 10 using a gate in panel (GIP) method and may be formed on the thin film transistor together with the pixel array.

The timing controller 18 signal-processes image data input from the host computer 50 and supplies the signal-processed data to the data driver 12. For example, the timing controller 18 may correct and output data through over driving to add an overshoot value or undershoot value based on data difference between neighboring frames so as to reduce a response time of liquid crystals. Also, the timing controller 18 generates a data control signal to control drive timing of the data driver 12 and a gate control signal to control drive timing of the gate driver 14 using a plurality of synchronizing signals, such as a vertical synchronizing signal Vsync, a horizontal synchronizing signal Hsync, a data enable signal and a dot clock, input from the host computer 50. The timing controller 18 outputs the generated data control signal and gate control signal to the data driver 12 and gate driver 14, respectively. The data control signal includes a source start pulse and source sampling clock to control latching of a data signal, a polarity control signal to control polarity of the data signal, and a source output enable signal to control an output period of the data signal. The gate control signal includes a gate start pulse and gate shift clock to control scanning of a gate signal and a gate output enable signal to control an output period of the gate signal. The timing controller 18 may supply the synchronizing signals, such as the vertical synchronizing signal Vsync and the horizontal synchronizing signal Hsync, to the touch controller 30 to control drive timing of the touch controller 30 so that drive timing of the display panel 10 is interlocked with drive timing of the touch sensor 20.

The touch sensor 20 senses user touch so that a user interacts with the GUI displayed on the display panel 10. A capacitive type touch sensor that recognizes touch by sensing change of capacitance generated from movement of a small amount of electric charges to a touch point when a conductive body, such as a human body or a stylus, touches the touch sensor is mainly used as the touch sensor 20. The touch sensor 20 may be attached to the display panel 10 or disposed in the pixel array of the display panel 10.

Figure 2:
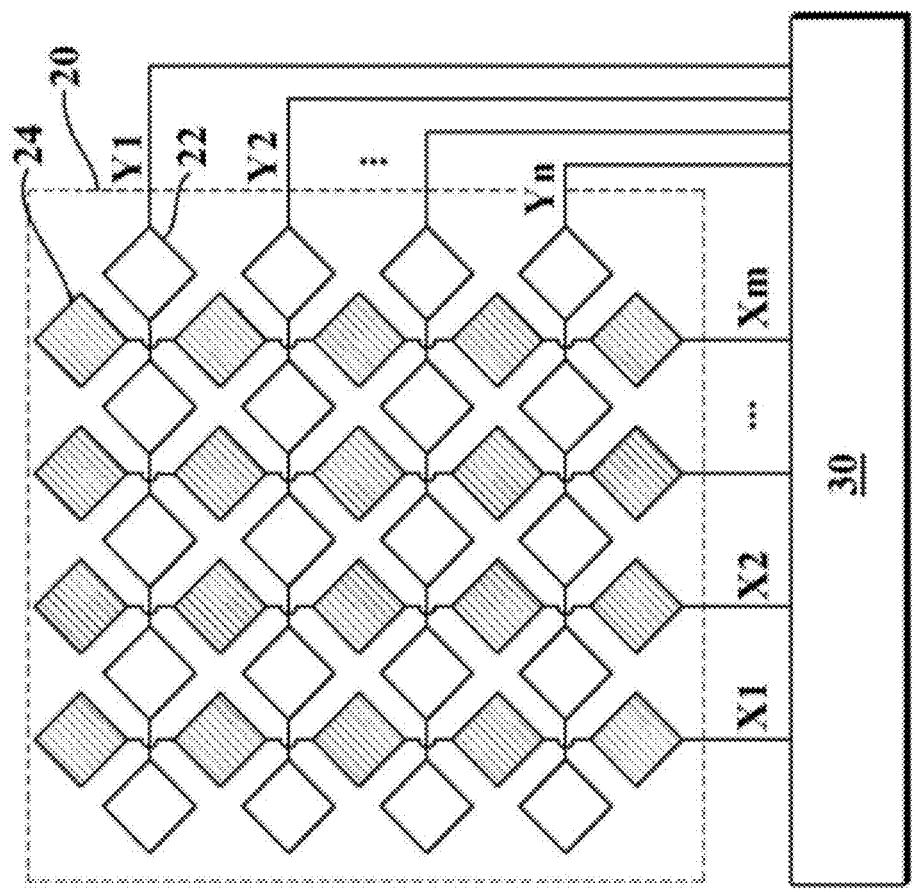
FIG. 2 is a view showing an example of the structure of a capacitive touch sensor shown in FIG. 1.

For example, as shown in FIG. 2, the capacitive type touch sensor 20 attached to the display panel 10 may include a plurality of conduction lines Y1 to Yn configured by electrically connecting a plurality of first sensing electrodes 22 arranged in the horizontal direction and a plurality of conduction lines X1 to Xm configured by electrically connecting a plurality of second sensing electrodes 24 arranged in the vertical direction. Each of the first and second sensing electrodes 22 and 24 may be formed in a diamond shape although each of the first and second sensing electrodes 22 and 24 may be formed in other shapes. The first and second sensing electrodes 22 and 24 are driven by the touch controller 30 to form capacitance through a fringe field and to form a capacitor with a conductive touch body touching the touch sensor 20, thereby changing capacitance, and outputs a signal indicating whether touch has been made through the first conduction lines or the second conduction lines.

The first conduction lines Y1 to Yn of the touch sensor 20 may be divided into a plurality of regions in a group self-sensing mode of the touch controller 30 so as to be driven or sensed while the respective regions are grouped, and may be driven or sensed per channel in a per-channel mutual sensing mode in a region selected by the touch controller 30. The second conduction lines X1 to Xm of the touch sensor 20 may be divided into a plurality of regions in a group self-sensing mode of the touch controller 30 so as to be driven or sensed while the respective regions are grouped, and may be driven or sensed per channel in a per-channel mutual sensing mode in a region selected by the touch controller 30.

On the other hand, the first conduction lines Y1 to Yn of the touch sensor 20 may be divided into a plurality of regions in a group mutual sensing mode of the touch controller 30 so as to be driven or sensed while the respective regions are grouped, and may be driven or sensed per channel in a per-channel mutual sensing mode in a region selected by the touch controller 30. The second conduction lines X1 to Xm of the touch sensor 20 may be divided into a plurality of regions in a group mutual sensing mode of the touch controller 30 so as to be driven or sensed while the respective regions are grouped, and may be driven or sensed per channel in a per-channel mutual sensing mode in a region selected by the touch controller 30.

The touch controller 30 supplies a drive signal to the touch sensor 20, senses touch using a signal output from the touch sensor 20, calculates touch information from the sensed result, and supplies the calculated touch information to the host computer 50. The touch information calculated by the touch controller 30 may include coordinates of touch points, the number of the touch points, the number of times of touch within a given unit time, touch continuance time, etc.

The touch controller 30 drives the touch sensor 20 in a per-region group sensing mode, i.e. a per-region group self-sensing mode or a per-region group mutual sensing mode, according to whether touch has been made to sense the touch per region, and drives the touch sensor 20 in a per-channel mutual sensing mode in a selected region to finely sense touch per channel only in the selected region.

Figure 3:
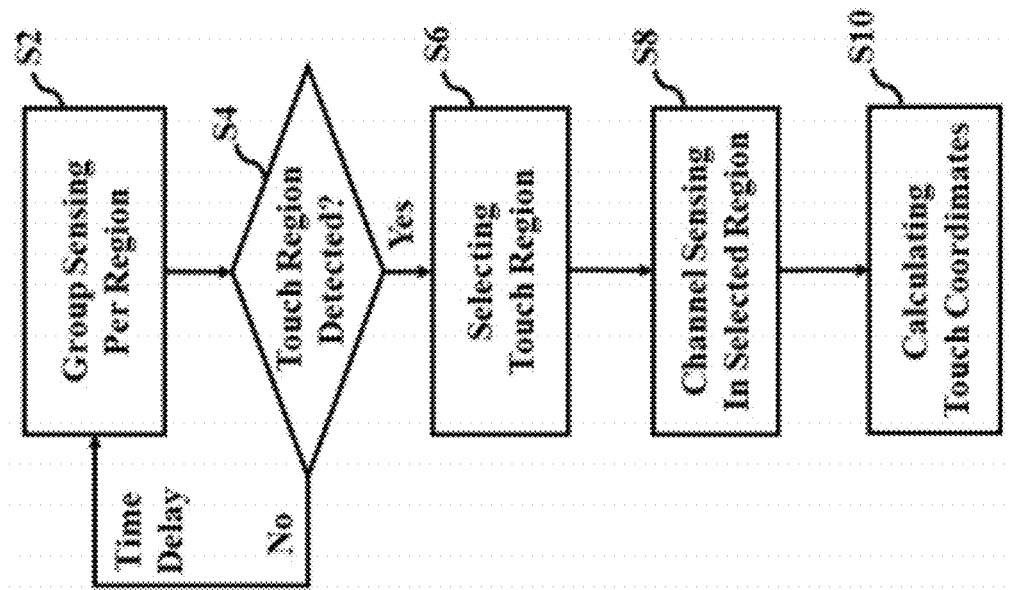
FIG. 3 is a flow chart showing a method of driving a touch controller shown in FIG. 1.

In other words, as shown in FIG. 3, the touch controller 30 divides the touch sensor 20 into a plurality of regions until a touch point is detected, and drives the touch sensor per region in a group sensing mode, such as a group self-sensing mode or a group mutual sensing mode to periodically repeat touch sensing per region (S2 and S4). If at least one touch region is detected in the per-region group sensing mode, the touch controller 30 selects a region in which the touch has been made (S6). Subsequently, the touch controller 30 drives only the selected touch region per channel in a mutual-capacitance sensing mode to finely sense touch per channel (S8). The touch controller 30 calculates touch information, including coordinates of touch points and the number of touch points, from the finely sensed signal and supplies the calculated touch information to the host computer 50 (S10).

In the group self-sensing mode, the touch sensor 20 is divided into a plurality of regions, the first conduction lines are grouped (shorted) in each region, the grouped first conduction lines are simultaneously scanned, and change of self-capacitance is sensed using a signal fed back through the grouped first conduction lines to sense whether touch has been made per region. Subsequently, the second conduction lines are grouped (shorted) in each region, the grouped second conduction lines are simultaneously scanned, and change of self-capacitance is sensed using a signal fed back through the grouped second conduction lines to sense whether touch has been made per region.

In the group mutual sensing mode, the touch sensor is divided into a plurality of regions, the first conduction lines are grouped (shorted) in each region, the grouped first conduction lines are simultaneously scanned, the second conduction lines are grouped (shorted) in each region, and change of mutual-capacitance is sensed using output of the grouped second conduction lines to sense whether touch has been made per region. On the other hand, in the group mutual sensing mode, the second conduction lines may be grouped and scanned in each region, and the first conduction lines may be grouped in each region to sense whether touch has been made.

In the per-channel mutual sensing mode, a plurality of first conduction lines included in a selected touch region is sequentially scanned per channel, and change of mutual-capacitance is sensed per channel through a plurality of second conduction lines included in the selected region to sense whether touch has been made per channel only in the selected region.

The host computer 50 supplies image data and a plurality of synchronizing signals to the timing controller 18, analyzes touch information input from the touch controller 30, and performs a command corresponding to a user touch operation.

Figure 4:
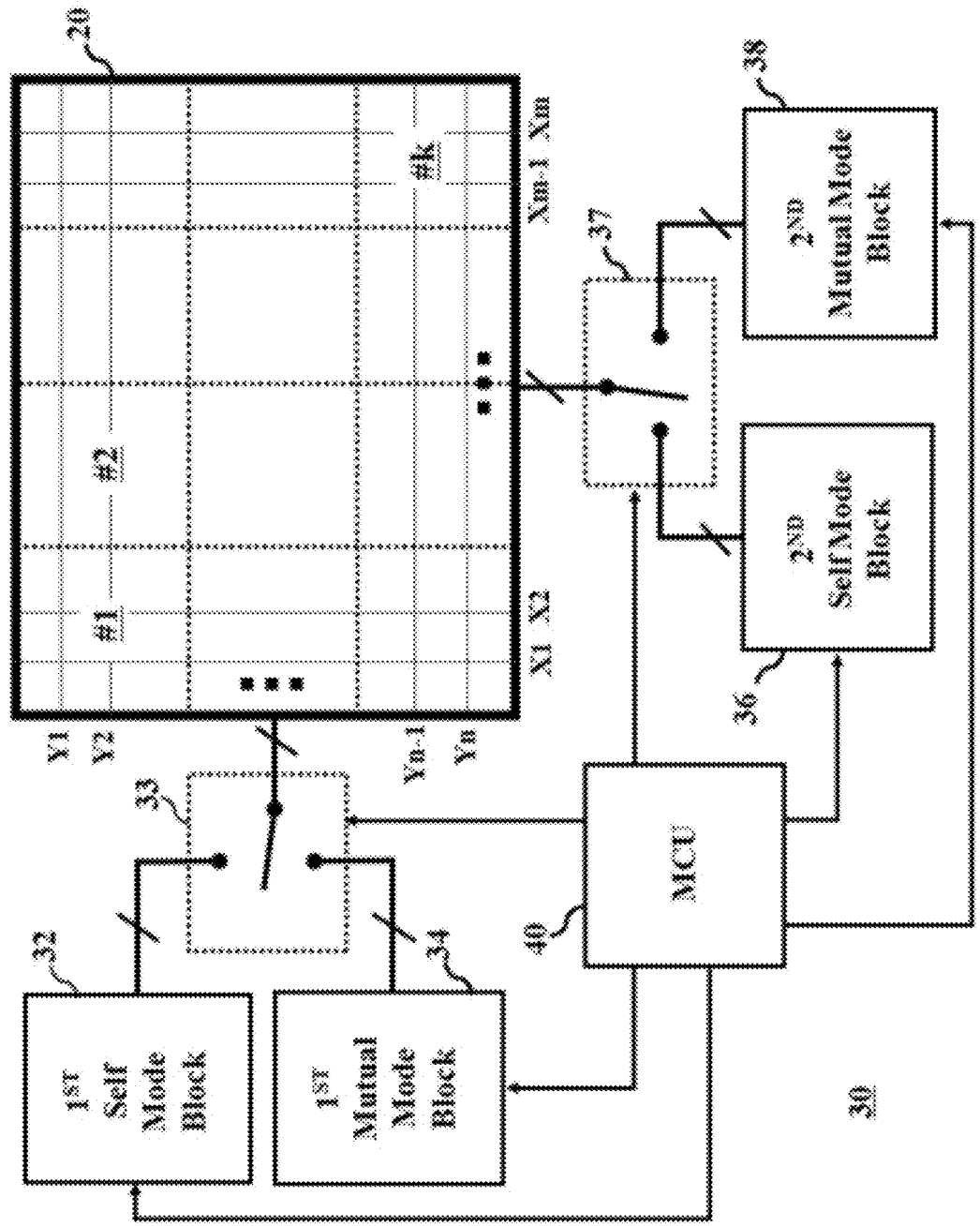
FIG. 4 is a circuit block diagram schematically showing the construction of the touch controller shown in FIG. 1.

FIG. 4 is a block diagram schematically showing the construction of the touch controller shown in FIG. 1.

Referring to FIG. 4, the touch controller 30 includes a first self mode block 32 and first mutual mode block 34 selectively connected to the first conduction lines Y1 to Yn of the touch sensor 20 through a first mode switching block 33, a second self mode block 36 and second mutual mode block 38 selectively connected to the second conduction lines X1 to Xm of the touch sensor 20 through a second mode switching block 37, and a microcontroller unit (MCU) 36 to control the self mode blocks 32 and 36, the mutual mode blocks 34 and 38, and the mode switching blocks 33 and 37.

The touch sensor 20 includes n (n is a positive integer) first conduction lines Y1 to Yn and m (m is a positive integer) second conduction lines X1 to Xm intersecting the first conduction lines Y1 to Yn in an insulated state. The touch sensor 20 is driven in a state in which the touch sensor 20 is divided into i×j=k (i is a partition number in the vertical direction, which is a positive integer less than n, j is a partition number in the horizontal direction, which is a positive integer less than m, and k is a positive integer) regions #1 to #k so as to include predetermined portions of the first conduction lines Y1 to Yn and second conduction lines X1 to Xm.

The first mode switching block 33 connects the first self mode block 32 or the first mutual mode block 34 to the first conduction lines Y1 to Yn of the touch sensor 20 in response to a sensing mode of the MCU 40. Specifically, the first mode switching block 33 connects the first self mode block 32 to the first conduction lines Y1 to Yn of the touch sensor 20 in response to a group self-sensing mode of the MCU 40 and connects the first mutual mode block 34 to the first conduction lines Y1 to Yn of the touch sensor 20 in response to a channel mutual sensing mode of the MCU 40. On the other hand, the first mode switching block 33 may connect the first mutual mode block 34 to the first conduction lines Y1 to Yn of the touch sensor 20 in response to a group mutual sensing mode and channel mutual sensing mode of the MCU 40.

The second mode switching block 37 connects the second self mode block 36 or the second mutual mode block 38 to the second conduction lines X1 to Xm of the touch sensor 20 in response to a sensing mode of the MCU 40. Specifically, the second mode switching block 37 connects the second self mode block 36 to the second conduction lines X1 to Xm of the touch sensor 20 in response to a group self-sensing mode of the MCU 40 and connects the second mutual mode block 38 to the second conduction lines X1 to Xm of the touch sensor 20 in response to a channel mutual sensing mode of the MCU 40. On the other hand, the second mode switching block 37 may connect the second mutual mode block 38 to the second conduction lines X1 to Xm of the touch sensor 20 in response to a group mutual sensing mode and channel mutual sensing mode of the MCU 40.

In the group self-sensing mode, the first self mode block 32 is connected to the first conduction lines Y1 to Yn of the touch sensor 20 through the first mode switching block 33. The first self mode block 32 divides the first conduction lines Y1 to Yn into i regions under control of the MCU 40, groups (shorts) the first conduction lines in each region, supplies a drive signal to the first conduction lines grouped per region, and senses the change of self-capacitance using a signal fed back through the grouped first conduction lines to sense whether touch has been made per region.

In the group self-sensing mode, the second self mode block 36 is connected to the second conduction lines X1 to Xm of the touch sensor 20 through the second mode switching block 37. The second self mode block 36 divides the second conduction lines X1 to Xm into j regions under control of the MCU 40, groups (shorts) the second conduction lines in each region, supplies a drive signal to the second conduction lines grouped per region, and senses the change of self-capacitance using a signal fed back through the grouped second conduction lines to sense whether touch has been made per region.

For example, each of the first and second self mode blocks 32 and 36 compares a delay time of the signal fed back through the grouped conduction lines with a predetermined reference value and determines whether touch has been made per region based on results of the comparison. When touch has been made in each region, the capacitance of the region varies (increases) with the result that a delay time of the feedback signal from the grouped first or second conduction lines in each region differs from the reference value. Consequently, it is possible to sense whether touch has been made per region based on the difference between the delay time of the feedback signal and the reference value.

In the group mutual sensing mode and the channel mutual sensing mode, the first mutual mode block 34 is connected to the first conduction lines Y1 to Yn of the touch sensor 20 through the first mode switching block 33. The first mutual mode block 34 divides the first conduction lines Y1 to Yn into i regions in response to a group mutual sensing mode of the MCU 40, groups (shorts) the first conduction lines in each region, and supplies a drive signal to the first conduction lines grouped per region. Also, the first mutual mode block 34 sequentially supplies a drive signal to first conduction lines of a selected region per channel in response to a channel mutual sensing mode of the MCU 40.

In the group mutual sensing mode and the channel mutual sensing mode, the second mutual mode block 38 is connected to the second conduction lines X1 to Xm of the touch sensor 20 through the second mode switching block 37. The second mutual mode block 38 divides the second conduction lines X1 to Xm into j regions in response to a group mutual sensing mode of the MCU 40, groups (shorts) the second conduction lines in each region, and senses the change of mutual-capacitance using output signals of the second conduction lines grouped per region to sense whether touch has been made per region. Also, the second mutual mode block 38 sequentially senses the change of mutual-capacitance per channel using output signals of second conduction lines of a selected region in response to a channel mutual sensing mode of the MCU 40 to sense whether touch has been made per channel in the selected region. For example, the second mutual mode block 38 compares output signals (current or voltage) of the second conduction lines grouped per region with a predetermined reference value (current or voltage) and determines whether touch has been made per region based on results of the comparison. Also, the second mutual mode block 38 compares output signals of the second conduction lines grouped per channel in a selected region with a predetermined reference value and determines whether touch has been made per channel based on results of the comparison.

Meanwhile, in the group mutual sensing mode and the channel mutual sensing mode, the second mutual mode block 38 drives the second conduction lines X1 to Xm, and the first mutual mode block 34 senses whether touch has been made per region and per channel using output signals of the first conduction lines Y1 to Yn, according to transmitting and receiving mode control of the MCU 40 based on setting of options performed by a designer or user.

Based on determination as to whether touch has been made, the MCU 40 controls the first and second mode switching blocks 33 and 37 so that the first and second self mode blocks 32 and 36 are connected to the touch sensor 20 or controls the first and second mode switching blocks 33 and 37 so that the first and second mutual mode blocks 34 and 38 are connected to the touch sensor 20.

In other words, the MCU 40 controls the first and second mode switching blocks 33 and 37 so that the first and second self mode blocks 32 and 36 are connected to the touch sensor 20 in the group sensing mode until a touch region is generated. When the touch region is generated in the group sensing mode, the MCU 40 enters the channel sensing mode and controls the first and second mode switching blocks 33 and 37 so that the first and second mutual mode blocks 34 and 38 are connected to the touch sensor 20. At this time, the MCU 40 selects a region in which touch has been made, and controls the first and second mutual mode blocks 34 and 38 to drive only the first and second conduction lines in the selected region.

On the other hand, the MCU 40 may control the first and second mode switching blocks 33 and 37 so that the first and second mutual mode blocks 34 and 38 are connected to the touch sensor 20 even in the group sensing mode until a touch region is generated according to transmitting and receiving mode control of the MCU 40 based on setting of options performed by the designer or user. That is, the designer (user) may control the MCU 40 through option setting to select a group self-sensing mode using the first and second self mode blocks 32 and 36 in the group sensing mode or to select a group mutual sensing mode using the first and second mutual mode blocks 34 and 38 in the group sensing mode.

Meanwhile, the touch controller 30 may drive both the group mutual sensing mode and channel mutual sensing mode using only the first and second mutual mode blocks 34 and 38 without setting of options performed by the designer (user). In this case, the first and second self mode blocks 32 and 36 and the first and second mode switching blocks 33 and 37 may be omitted from the touch controller 30 shown in FIG. 3 to simplify a circuit design.

Also, in the channel sensing mode, the MCU 40 calculates touch coordinates using sensed data input per channel in a selected region from the first mutual mode block 34 or second mutual mode block 38 and supplies the calculated touch coordinates to the host computer. In addition, the MCU may calculate the number of touch points from the calculated touch coordinate values, count the calculated number of touch points within a unit time to calculate the number of times of touch, or calculate touch continuance time within a unit time.

Figure 5A:
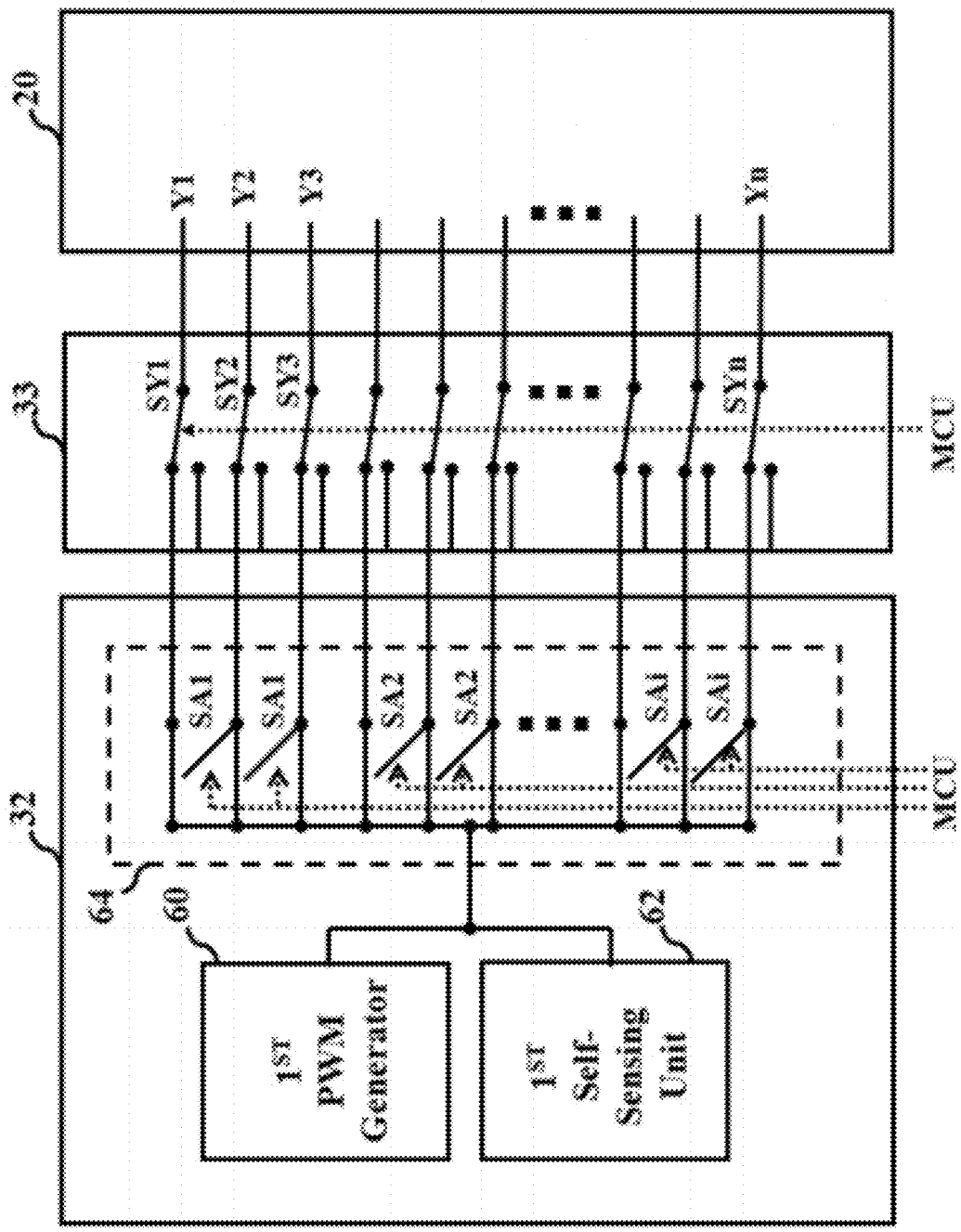
FIGS. 5A and 5B are circuit block diagrams respectively showing examples of the detailed constructions of first and second self mode blocks shown in FIG. 4.
Figure 5B:
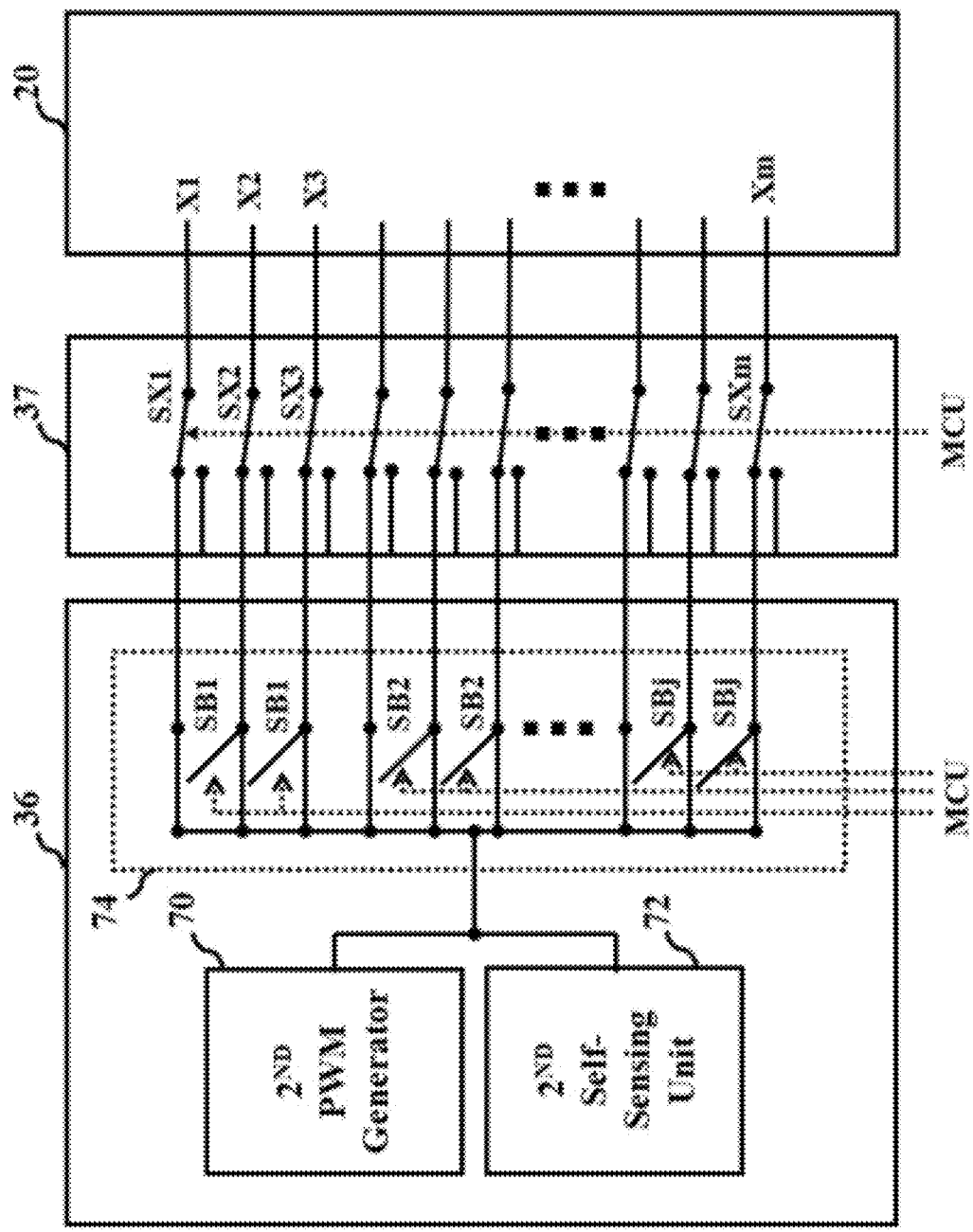

FIGS. 5A and 5B are circuit block diagrams respectively showing examples of the detailed constructions of the first and second self mode blocks 32 and 36 shown in FIG. 4.

Referring to FIG. 5A, the first self mode block 32 includes a first pulse width modulation (PWM) generator 60 to generate a first PWM signal, a first self-sensing unit 62 connected in parallel to an output line of the first PWM generator 60 via a feedback line, and a first grouping switch block 64 connected in common to the output line of the first PWM generator 60 and the feedback line of the first self-sensing unit 62 to divide n input lines I1 to In of the first mode switching block 33 into i regions and to sequentially group the input lines per region.

The first mode switching block 33 includes n first mode switches SY1 to SYn to connect n first conduction lines Y1 to Yn of the touch sensor 20 to n channels of the first self mode block 32 per channel or to n channels of the first mutual mode block 34 shown in FIG. 4 per channel under control of the MCU 40. In FIG. 5A, the first mode switching block 33 connects the n first conduction lines Y1 to Yn of the touch sensor 20 to the n channels of the first self mode block 32 per channel under control of the MCU 40.

The first PWM generator 60 generates and outputs a first PWM signal to drive the first conduction lines Y1 to Yn of the touch sensor 20.

The first self-sensing unit 62 senses a delay time of a signal fed back from the grouped first conduction lines Y1 to Yn via the feedback line connected in parallel to the output line of the first PWM generator 60 according to variation of self-capacitance to determine whether touch has been made per region.

The first grouping switch block 64 divides the input lines I1 to In of the first mode switching block 33 into i regions and groups the input lines per region under control of the MCU 40. Consequently, the first grouping switch block 64 divides the n first conduction lines Y1 to Yn connected to the n input lines I1 to In per channel through the first mode switching block 33 into i regions and groups the conduction lines per region. To this end, the first grouping switch block 64 includes a plurality of first grouping switches SA1 to SAi connected between the input lines I1 to In of the first mode switching block 33 per region. In a case in which p (p is a positive integer less than n) input lines (first conduction lines) are included in each region, p-1 first grouping switches SA1, SA2, . . . or SAi to group the p input lines (first conduction lines) are connected between the p input lines. No first grouping switch SA is formed between the last input line of each region and the first input line of the next region. The first grouping switches SA1, SA2, . . . or SAi of the first grouping switch block 64 short input lines of the first mode switching block 33 in a corresponding region under control of the MCU 40 to group the first conduction lines in the corresponding region connected through the first mode switching block 33. As a result, the first PWM signal from the first PWM generator 60 is simultaneously supplied to the first conduction lines of the corresponding region grouped through the first grouping switch block 64 and the first mode switching block 33, and the first self-sensing unit 62 senses a delay time of a signal fed back from the first conduction lines of the corresponding region grouped through the first mode switching block 33 and the first grouping switch block to determine whether touch has been made in the corresponding region.

Referring to FIG. 5B, the second self mode block 36 includes a second PWM generator 70 to generate a second PWM signal, a second self-sensing unit 72 connected in parallel to an output line of the second PWM generator 70 via a feedback line, and a second grouping switch block 74 connected in common to the output line of the second PWM generator 70 and the feedback line of the second self-sensing unit 72 to divide m input lines I1 to Im of the second mode switching block 37 into j regions to sequentially group the input lines per region.

The second mode switching block 37 includes m second mode switches SX1 to SXm to connect n second conduction lines X1 to Xm of the touch sensor 20 to m channels of the second self mode block 36 per channel or to m channels of the second mutual mode block 38 shown in FIG. 4 per channel under control of the MCU 40. In FIG. 5B, the second mode switching block 37 connects the m second conduction lines X1 to Xm of the touch sensor 20 to the m channels of the second self mode block 36 per channel under control of the MCU 40.

The second PWM generator 70 generates and outputs a second PWM signal to drive the second conduction lines X1 to Xm of the touch sensor 20.

The second self-sensing unit 72 senses a delay time of a signal fed back from the grouped second conduction lines X1 to Xm via the feedback line connected in parallel to the output line of the second PWM generator 70 according to variation of self-capacitance to determine whether touch has been made per region.

The second grouping switch block 74 divides the input lines I1 to Im of the second mode switching block 37 into j regions and groups the input lines per region under control of the MCU 40. Consequently, the second grouping switch block 64 divides the m second conduction lines X1 to Xm connected to the m input lines I1 to Im per channel through the second mode switching block 37 into j regions and groups the conduction lines per region. To this end, the second grouping switch block 74 includes a plurality of second grouping switches SB1 to SBj connected between the input lines I1 to Im of the second mode switching block 37 per region. In a case in which s (s is a positive integer less than m) input lines (second conduction lines) are included in each region, s-1 second grouping switches SB1, SB2, . . . or SBj to group the s input lines (second conduction lines) are connected between the s input lines. No second grouping switch SB is formed between the last input line of each region and the first input line of the next region. The second grouping switches SB1, SB2, . . . or SBj of the second grouping switch block 74 short input lines of the second mode switching block 37 in a corresponding region under control of the MCU 40 to group the second conduction lines in the corresponding region connected through the second mode switching block 37. As a result, the second PWM signal from the second PWM generator 70 is simultaneously supplied to the second conduction lines of the corresponding region grouped through the second grouping switch block 74 and the second mode switching block 37, and the second self-sensing unit 72 senses a delay time of a signal fed back from the grouped second conduction lines through the second mode switching block 37 and the second grouping switch block 74 to determine whether touch has been made in the corresponding region.

Figure 6A:
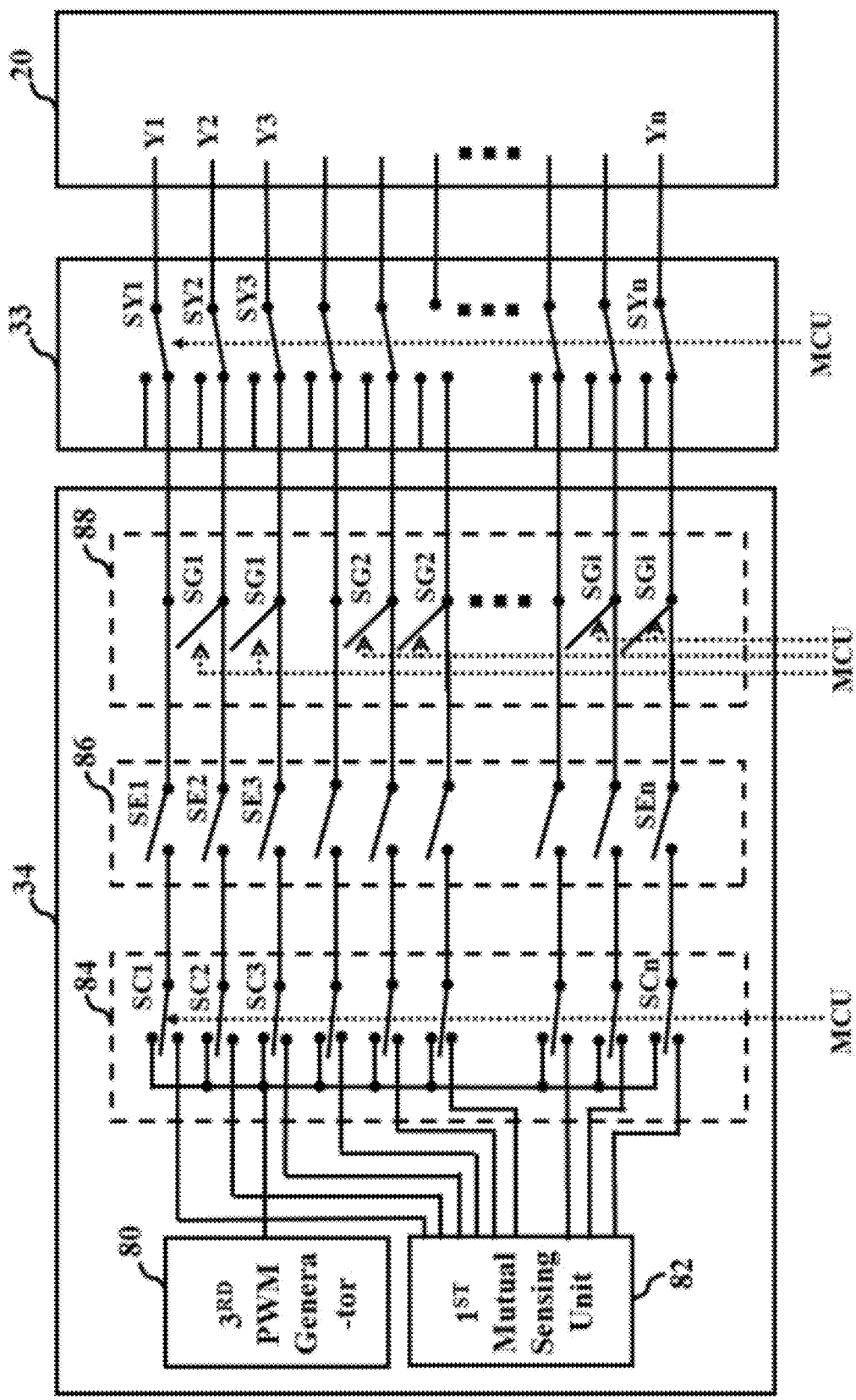
FIGS. 6A and 6B are circuit block diagrams respectively showing examples of the detailed constructions of first and second mutual mode blocks shown in FIG. 4.
Figure 6B:
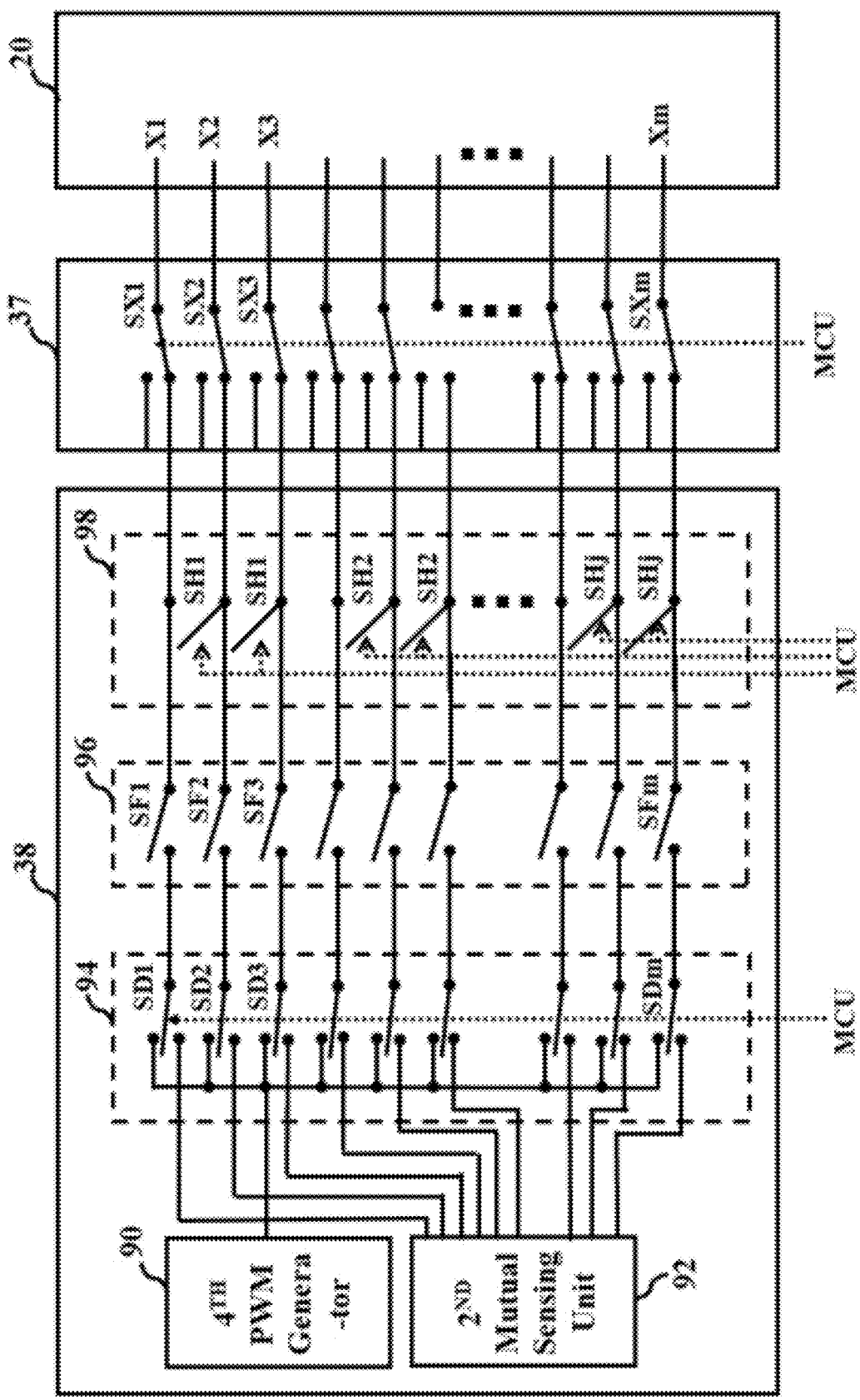

FIGS. 6A and 6B are circuit block diagrams respectively showing examples of the detailed constructions of the first and second mutual mode blocks 34 and 38 shown in FIG. 4.

Referring to FIG. 6A, the first mutual mode block 34 includes a third PWM generator 80 to generate a third PWM signal, a first mutual sensing unit 82, a first transmitting and receiving switching block 84 selectively connected to the third PWM generator 80 and the first mutual sensing unit 82, a first channel switching block 86 to selectively switch channels between the first transmitting and receiving switching block 84 and the first mode switching block 33, and a third grouping switch block 88 to divide input lines of the first mode switching block 33 into i regions and to group the input lines per region.

In FIG. 6A, the first mode switching block 33 connects the n first conduction lines Y1 to Yn of the touch sensor 20 to n channels of the first mutual mode block 34 per channel under control of the MCU 40.

The third PWM generator 80 generates and outputs a third PWM signal to drive the first conduction lines Y1 to Yn of the touch sensor 20.

The first mutual sensing unit 82 senses a delay time of output signals from the first conduction lines Y1 to Yn of the touch sensor 20, which are input via the first mode switching block 33, the third grouping switch block 88, the first channel switching block 86 and the first transmitting and receiving switching block 84, per region or per channel of a selected region according to variation of self-capacitance to determine whether touch has been made per region or per channel of the selected region.

The first transmitting and receiving switching block 84 connects an output end of the third PWM generator 80 or an input end of the first mutual sensing unit 82 to the first channel switching block 86 under control of the MCU 40 based on setting of options performed by the designer or user. To this end, the first transmitting and receiving switching block 84 includes n transmitting and receiving switches SC1 to SCn to connect n input lines of the first channel switching block 86 to n output lines diverged from an output end of the third PWM generator 80 per channel or to n input lines of the first mutual sensing unit 82 per channel under control of the MCU 40. If the designer (user) sets the first mutual mode block 34 to a transmitting mode, the first transmitting and receiving switching block 84 connects the output end of the third PWM generator 80 to the first channel switching block 86 under control of the MCU 40. On the other hand, if the designer (user) sets the first mutual mode block 34 to a receiving mode, the first transmitting and receiving switching block 84 connects the input end of the first mutual sensing unit 82 to the first channel switching block 86 under control of the MCU 40.

The first channel switching block 86 is switched per channel under control of the MCU 40 to connect n output lines of the first transmitting and receiving switching block 84 to n input lines of the first mode switching block 33 per channel. To this end, the first channel switching block 86 includes n channel switches SE1 to SEn individually connected between the n output lines of the first transmitting and receiving switching block 84 and n input lines of the third grouping switch block 88. In a group mutual sensing mode, at least one first channel switch of the first channel switching block 86 is turned on per region under control of the MCU 40, or, in a channel mutual sensing mode, a plurality of first channel switches of the first channel switching block 86 is sequentially turned on in a selected region under control of the MCU 40.

In the group mutual sensing mode, the third grouping switch block 88 divides the input lines I1 to In of the first mode switching block 33 into i regions and groups the input lines per region under control of the MCU 40. Consequently, the third grouping switch block 88 divides the n first conduction lines Y1 to Yn connected to the n input lines I1 to In per channel through the first mode switching block 33 into i regions and groups the conduction lines per region. To this end, the third grouping switch block 88 has the same construction as in the first grouping switch blocks 64 shown in FIG. 5A. Third grouping switches SG1, SG2, . . . or SGi of the third grouping switch block 88 short input lines of the first mode switching block 33 in a corresponding region under control of the MCU 40 to group the first conduction lines in the corresponding region connected through the first mode switching block 33. In a transmitting mode or a group mutual sensing mode, therefore, the third PWM signal supplied from the third PWM generator 80 via the first transmitting and receiving switching block 84 and the first channel switching block 86 is simultaneously supplied to the first conduction lines of the corresponding region grouped through the third grouping switch block 88 and the first mode switching block 33. In a receiving mode or a group mutual sensing mode, on the other hand, output signals from the first conduction lines of the corresponding region grouped through the third grouping switch block 88 and the first mode switching block 33 are supplied to the first mutual sensing unit 82 via the first channel switching block 86 and the first transmitting and receiving switching block 84. Meanwhile, in a channel mutual sensing mode, the third grouping switch block 88 is turned off under control of the MCU 40.

Referring to FIG. 6B, the second mutual mode block 38 includes a fourth PWM generator 90 to generate a fourth PWM signal, a second mutual sensing unit 92, a second transmitting and receiving switching block 94 selectively connected to the fourth PWM generator 90 and the second mutual sensing unit 92, a second channel switching block 96 to selectively switch channels between the second transmitting and receiving switching block 94 and the second mode switching block 37, and a fourth grouping switch block 98 to divide input lines of the second mode switching block 37 into i regions and to group the input lines per region.

In FIG. 6B, the second mode switching block 37 connects the m second conduction lines X1 to Xm of the touch sensor 20 to m channels of the second mutual mode block 38 per channel under control of the MCU 40.

The fourth PWM generator 90 generates and outputs a fourth PWM signal to drive the second conduction lines X1 to Xm of the touch sensor 20.

The second mutual sensing unit 92 senses output signals from the second conduction lines X1 to Xm of the touch sensor 20, which are input via the second mode switching block 37, the fourth grouping switch block 98, the second channel switching block 96 and the second transmitting and receiving switching block 94, per region or per channel of a selected region according to variation of self-capacitance to determine whether touch has been made per region or per channel of the selected region.

The second transmitting and receiving switching block 94 connects an output end of the fourth PWM generator 90 or an input end of the second mutual sensing unit 92 to the second channel switching block 96 under control of the MCU 40 based on setting of options performed by the designer or user. To this end, the second transmitting and receiving switching block 94 includes m transmitting and receiving switches SD1 to SDm to connect m input lines of the second channel switching block 96 to m output lines diverged from an output end of the fourth PWM generator 90 per channel or to m input lines of the second mutual sensing unit 92 per channel under control of the MCU 40. If the designer (user) sets the second mutual mode block 38 to a transmitting mode, the second transmitting and receiving switching block 94 connects the output end of the fourth PWM generator 90 to the second channel switching block 96 under control of the MCU 40. On the other hand, if the designer (user) sets the second mutual mode block 38 to a receiving mode, the second transmitting and receiving switching block 94 connects the input end of the second mutual sensing unit 92 to the second channel switching block 96 under control of the MCU 40.

The second channel switching block 96 is switched per channel under control of the MCU 40 to connect m output lines of the second transmitting and receiving switching block 94 to m input lines of the second mode switching block 37 per channel. To this end, the second channel switching block 96 includes m channel switches SF1 to SFm individually connected between the m output lines of the second transmitting and receiving switching block 94 and m input lines of the fourth grouping switch block 98. In a group mutual sensing mode, at least one second channel switch of the second channel switching block 96 is turned on per region under control of the MCU 40, or, in a channel mutual sensing mode, a plurality of second channel switches of the second channel switching block 96 is sequentially turned on in a selected region under control of the MCU 40.

In the group mutual sensing mode, the fourth grouping switch block 98 divides the input lines of the second mode switching block 37 into j regions and groups the input lines per region under control of the MCU 40. Consequently, the fourth grouping switch block 98 divides the m first conduction lines X1 to Xm connected to the m input lines per channel through the second mode switching block 37 into i regions and groups the conduction lines per region. To this end, the fourth grouping switch block 98 has the same construction as in the second grouping switch blocks 74 shown in FIG. 5B. Fourth grouping switches SH1, SH2, ... or SHj of the fourth grouping switch block 98 short input lines of the second mode switching block 37 in a corresponding region under control of the MCU 40 to group the second conduction lines in the corresponding region connected through the second mode switching block 37. In a transmitting mode or a group mutual sensing mode, therefore, the fourth PWM signal supplied from the fourth PWM generator 90 via the second transmitting and receiving switching block 94 and the second channel switching block 96 is simultaneously supplied to the second conduction lines of the corresponding region grouped through the fourth grouping switch block 98 and the second mode switching block 37. In a receiving mode or a group mutual sensing mode, on the other hand, output signals from the second conduction lines of the corresponding region grouped through the fourth grouping switch block 98 and the second mode switching block 37 are supplied to the second mutual sensing unit 92 via the second channel switching block 96 and the second transmitting and receiving switching block 94. Meanwhile, in a channel mutual sensing mode, the fourth grouping switch block 98 is turned off under control of the MCU 40.

In the apparatus and method for driving the touch sensor according to the present invention as described above, the touch sensor is divided into a plurality of regions before a touch point is generated, and it is periodically determined whether touch has been made per region using a self-capacitance or mutual-capacitance sensing method as a per-region group sensing method. Also, in the apparatus and method for driving the touch sensor according to the present invention, when touch is made, a region in which the touch has been made is selected, and it is determined whether touch has been made per channel only in the selected region using a per-channel mutual-capacitance sensing method.

In the apparatus and method for driving the touch sensor according to the present invention, therefore, a group sensing method with respect to the entire region or a local channel sensing method with respect to a touch region is used depending upon whether touch is made, thereby reducing touch sensor drive time and touch algorithm calculation time as compared with a conventional case in which the entire region is scanned and sensed per channel irrespective of whether touch is made, and therefore, further decreasing power consumption.

Also, in an apparatus and method for driving a touch sensor according to another embodiment of the present invention, the touch sensor is divided into a plurality of regions in a power save mode, and it is periodically determined whether touch has been made per region using a per-region group scanning and sensing method, thereby reducing touch sensor drive time and touch algorithm calculation time.

Figure 7:
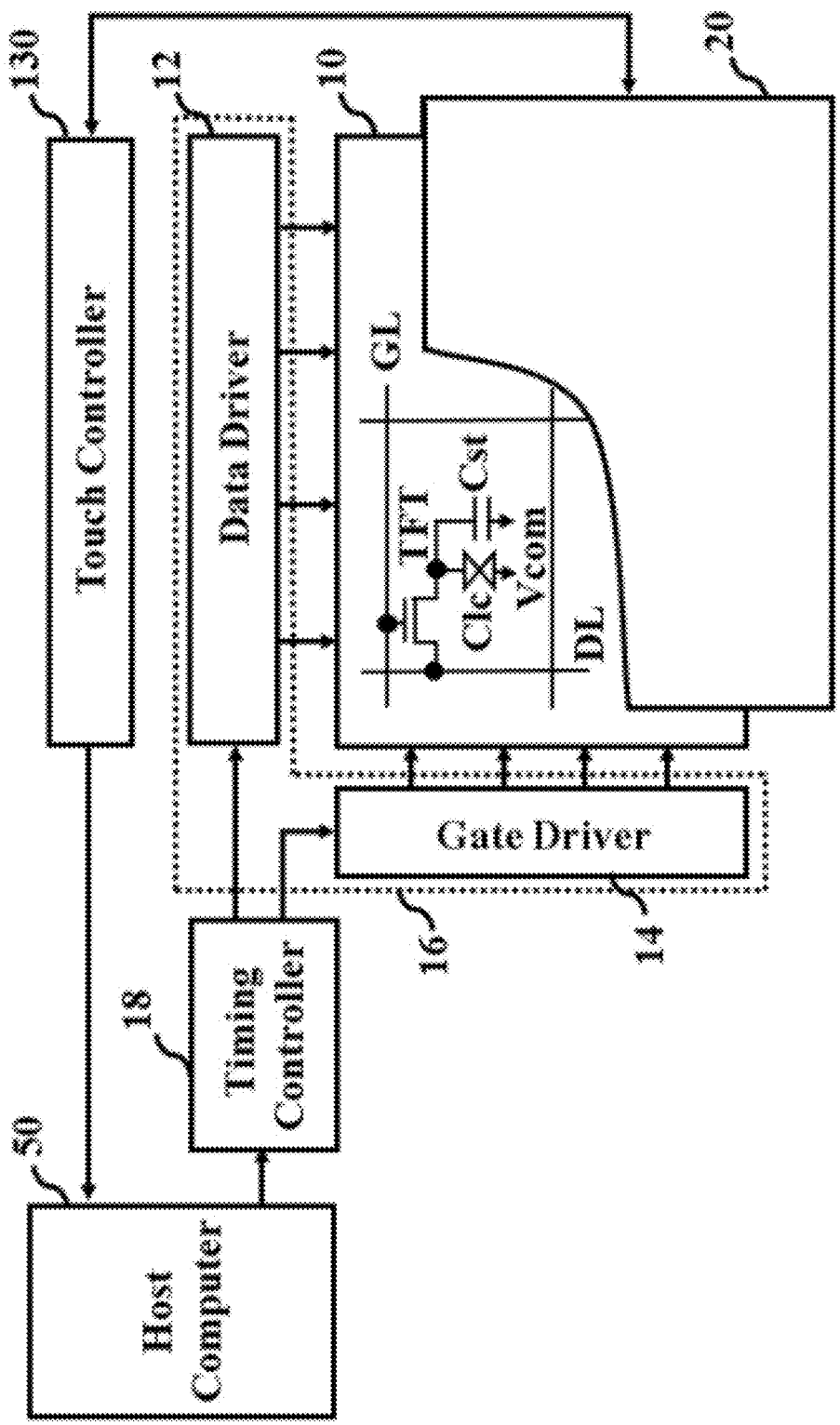
FIG. 7 is a circuit block diagram schematically showing the construction of a display device including a touch sensor drive apparatus according to another embodiment of the present invention.

FIG. 7 is a block diagram showing the construction of a display device including a touch sensor drive apparatus according to another embodiment of the present invention.

The display device shown in FIG. 7 is identical to that shown in FIG. 1 except a touch controller 130, and therefore, description of identical components of the display device will be omitted.

If touch information from the touch controller 30 is not input to the host computer 50 within a predetermined time, the host computer 50 switches the touch controller 130 to a power save mode, thereby reducing power consumption. If so, the host computer 50 switches the touch controller 130 to a sensing mode, which is a normal drive mode, to maintain touch sensing force.

The touch controller 130 is driven in the sensing mode, which is the normal drive mode, or in the power save mode to reducing power consumption under control of the host computer 50.

In the sensing mode, the touch controller 130 senses readout signals output from readout lines X1 to Xm per channel while driving scan lines Y1 to Yn of the touch sensor per channel to determine whether touch has been made, calculates touch information based on the result of determination, and supplies the calculated touch information to the host computer 50.

If touch is not generated on the touch sensor 20 and touch information is not input from the touch controller 30 within a predetermined time, the host computer 50 switches the touch controller 130 to the power save mode. When switching to the power save mode is performed by the host computer 50, the touch controller 130 divides the touch sensor 20 into a plurality of regions and periodically performs per-region group sensing to sense whether touch has been made per region. Per-region group sensing entails grouping (shorting) a plurality of scan lines included in each region to perform simultaneous scanning and grouping (shorting) a plurality of readout lines included in each region to sense whether touch has been made per region. If no touch region is detected using the per-region group sensing, the touch controller 130 periodically repeats the per-region group sensing while being maintained in the power save mode. On the other hand, if a touch region is detected using per-region group sensing, the touch controller 130 selects a region in which the touch has been detected and finely senses the selected touch region per channel. If touch information is input to the host computer 50 through fine sensing of the touch controller 130, the touch controller 130 is switched to the sensing mode. Fine sensing entails sequentially scanning a plurality of scan lines included in the selected region per channel and sensing whether touch has been made per channel through a plurality of readout lines included in the selected region.

Figure 8:
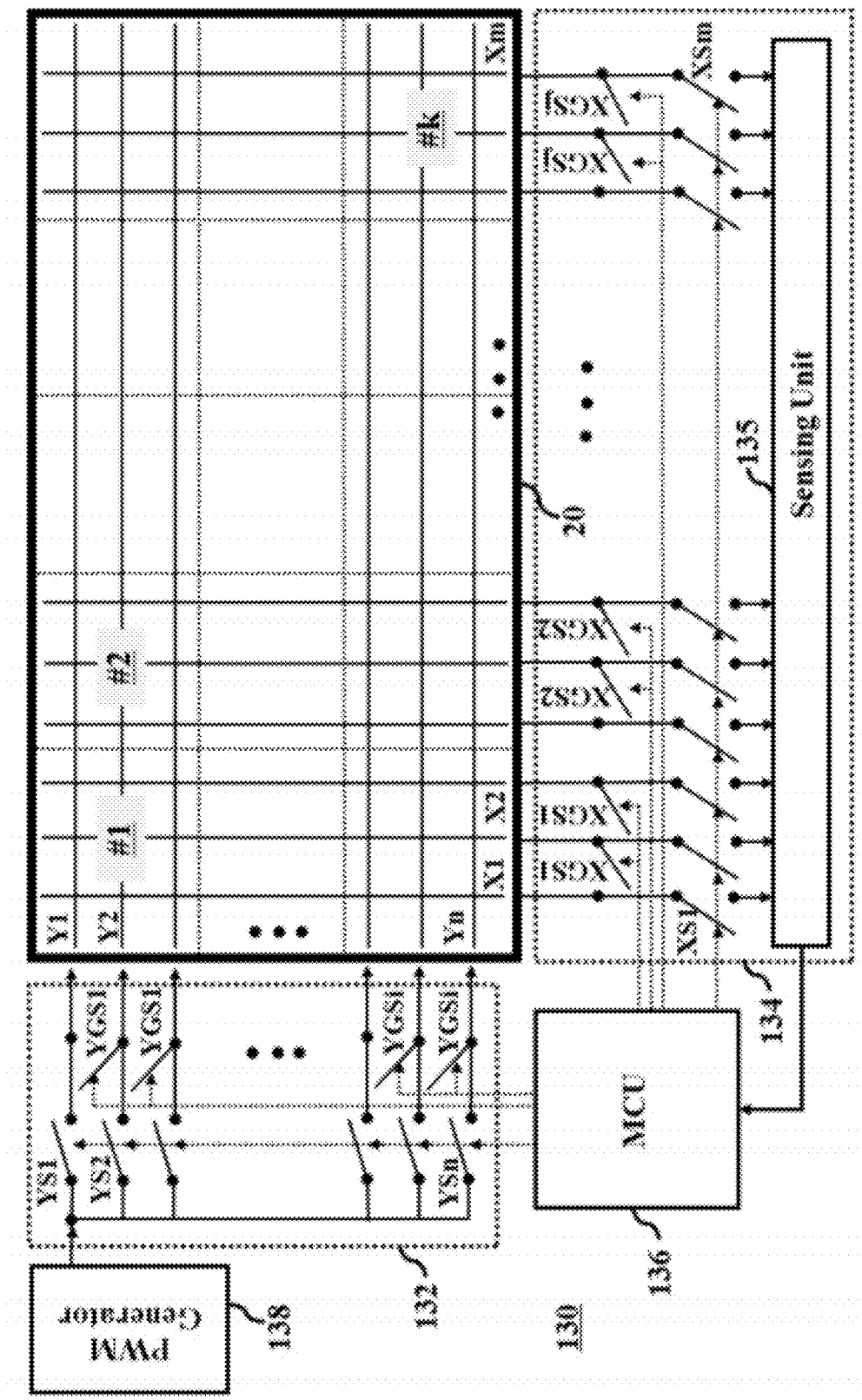
FIG. 8 is a circuit block diagram showing the detailed construction of a touch sensor and touch controller shown in FIG. 7.

FIG. 8 is a block diagram showing the construction of the touch controller shown in FIG. 7.

Referring to FIG. 8, the touch controller 130 includes a touch drive circuit 132 to drive scan lines Y1 to Yn of the touch sensor 20, a readout circuit 134 to sense whether touch has been made by calculating readout signals output from readout lines X1 to Xm of the touch sensor 20 using a touch algorithm, an MCU 136 to control the touch drive circuit 132 and the readout circuit 134, and a PWM generator 138 to generate and supply a PWM signal to the touch drive circuit 132.

The touch sensor 20 includes n (n is a positive integer) scan lines Y1 to Yn and m (m is a positive integer) readout lines X1 to Xm intersecting the scan lines Y1 to Yn in an insulated state. In a power save mode, the touch sensor 20 is driven in a state in which the touch sensor 20 is divided into $i \times j = k$ (i is a partition number in the vertical direction, which is a positive integer less than n, j is a partition number in the horizontal direction, which is a positive integer less than m, and k is a positive integer) regions #1 to #k so as to include predetermined portions of the scan lines Y1 to Yn and readout lines X1 to Xm.

The PWM generator 138 generates a PWM signal as a drive signal to be supplied to the scan lines Y1 to Yn of the touch sensor 20 and supplies the PWM signal to the touch drive circuit 132.

The touch drive circuit 132 switches the PWM signal supplied from the PWM generator 138 per channel or per region under control of the MCU 136 and supplies the switched PWM signal to the scan lines Y1 to Yn of the touch sensor 20. To this end, the touch drive circuit 132 includes n scan switches YS1 to YSn, n output lines of which are connected to the n scan lines Y1 to Yn per channel and n input lines of which are connected in common to an output line of the PWM generator 138, and a plurality of scan grouping switches YSG1 to YGSi connected between the scan lines per region. In a case in which p (p is a positive integer less than n) scan lines are included in each region, p-1 scan grouping switches to group the p scan lines are connected between the p scan lines. Consequently, no scan grouping switch YGS is formed between the last scan line of each region and the first scan line of the next region. The scan switches YS1 to YSn are individually switched under control of the MCU 136, and the scan grouping switches YSG1 to YGSi are grouped per region and switched under control of the MCU 136.

Specifically, in a sensing mode, all of the scan grouping switches YSG1 to YGSi are turned off under control of the MCU 136, and the n scan switches YS1 to YSn are switched per channel to sequentially supply a PWM signal to the n scan lines Y1 to Yn.

In a power save mode, the scan grouping switches YSG1 to YGSi are grouped into i regions and switched per region under control of the MCU 136. In each region, the scan grouping switches are simultaneously turned on under control of the MCU 136 to short scan lines in a corresponding region, and at least one of the scan switches in the corresponding region is turned on under control of the MCU 136 to supply a PWM signal. As a result, the shorted scan lines in the corresponding region are simultaneously driven according to the PWM signal.

If at least one region, in which touch has been made, is selected from among the k regions #1 to #k in the power save mode, all of the scan grouping switches YSG1 to YGSi are turned off under control of the MCU 136, and the scan switches in the selected region are switched per channel under control of the MCU 136 to sequentially supply a PWM signal. As a result, the scan lines in the selected region are sequentially driven according to the PWM signal.

The readout circuit 134 switches readout signals from readout lines X1 to Xm per channel or per region under control of the MCU 136 to determine whether touch has been made per channel or per region and supplies sensed results (sensed data) to the MCU 136. To this end, the readout circuit 134 includes a sensing unit 135, having m input lines corresponding to the m readout lines X1 to Xm, to generate sensed data from the readout signals output from the readout lines X1 to Xm and to output the generated data to the MCU 136, m readout switches XS1 to XSm connected between the readout lines X1 to Xm and the input lines of the sensing unit 135 per channel, and a plurality of readout grouping switches XGS1 to XGSj connected between the readout lines per region. In a case in which s (s is a positive integer less than m) readout lines are included in each region, s-1 readout grouping switches to group the s readout lines are connected between the s readout lines. Consequently, no readout grouping switch YGS is formed between the last readout line of each region and the first readout line of the next region.

The sensing unit 135 sequentially samples the readout signals output from the readout lines X1 to Xm per channel or per region, compares the sampled readout signals with a reference voltage, generates a sensed signal indicating whether touch has been made based on the results of comparison, converts the generated analog signal into digital data, and outputs the digital data to the MCU 136.

The m readout switches XS1 to XSm are individually switched under control of the MCU 136, and the readout grouping switches XGS1 to XGSj are grouped per region and switched under control of the MCU 136.

Specifically, in a sensing mode, all of the readout grouping switches XGS1 to XGSj are turned off under control of the MCU 136, and the m readout switches XS1 to XSm are switched per channel under control of the MCU 136 to sequentially supply the readout signals output from the m readout lines X1 to Xm to the sensing unit 135. The sensing unit 135 sequentially senses the readout signals input per channel, generates sensed data per channel, and outputs the generated data to the MCU 136.

In a power save mode, the readout grouping switches XGS1 to XGSj are grouped into j regions and switched per region under control of the MCU 136. In each region, the readout grouping switches are simultaneously turned on under control of the MCU 136 to short readout lines in a corresponding region, and at least one of the readout switches in the corresponding region is turned on under control of the MCU 136. As a result, readout signals output from the shorted readout lines in the corresponding region are supplied to the sensing unit 135 via the turned-on readout switches. The sensing unit 135 sequentially senses the readout signals input per region, generates sensed data per region, and outputs the generated data to the MCU 136.

If at least one region, in which touch has been made, is selected from among the k regions #1 to #k in the power save mode, all of the readout grouping switches XGS1 to XGSj are turned off under control of the MCU 136, and the readout switches in the selected region are switched per channel under control of the MCU 136 to sequentially supply readout signals from the readout lines in the selected region to the sensing unit 135 per channel. The sensing unit 135 sequentially senses a plurality of readout signals input per channel in the selected region, generates sensed data per channel, and outputs the generated data to the MCU 136.

According to a drive mode, the MCU 136 controls the touch drive circuit 132 to sequentially drive the n scan lines Y1 to Yn per channel or to group the n scan lines Y1 to Yn into i regions so that the scan lines are driven per region. Also, according to a drive mode, the MCU 136 controls the readout circuit 134 to read readout signals from the m readout lines X1 to Xm per channel or to group the m readout lines X1 to Xm into j regions so that the readout signals are read per region.

Specifically, in the sensing mode, the MCU 136 controls the touch drive circuit 132 to sequentially drive the n scan lines Y1 to Yn per channel and controls the readout circuit 134 to read readout signals from the m readout lines X1 to Xm per channel. In the power save mode, the MCU 136 controls the touch drive circuit 132 to group the n scan lines Y1 to Yn into i regions so that the scan lines are driven per region and controls the readout circuit 134 to group the m readout lines X1 to Xm into j regions so that the readout signals are read per region. If a touch region is detected in the power save mode, the detected region is selected, a plurality of scan lines included in the selected region is controlled to be driven per channel, and readout signals are controlled to be read from a plurality of readout lines included in the selected region per channel.

In the sensing mode, the MCU 136 calculates touch coordinates using sensed data input per channel from the readout circuit 134 and supplies the calculated touch coordinates to the host computer 50. The MCU 136 calculates touch coordinate values (XY coordinates) based on position information (X coordinate) of the readout line X at which touch data are generated and position information (Y coordinate) of the driven scan line Y. In addition, the MCU 136 may calculate the number of touch points from the calculated touch coordinate values, count the calculated number of touch points within a unit time to calculate the number of times of touch, or calculate touch continuance time within a unit time.

Also, in the power save mode, the MCU 136 selects a region in which touch has been made using sensed data input per region from the readout circuit 134, calculates touch coordinates using sensed data input per channel through the readout circuit 134 from the selected touch region, and supplies the calculated touch coordinates to the host computer 50.

Figure 9:
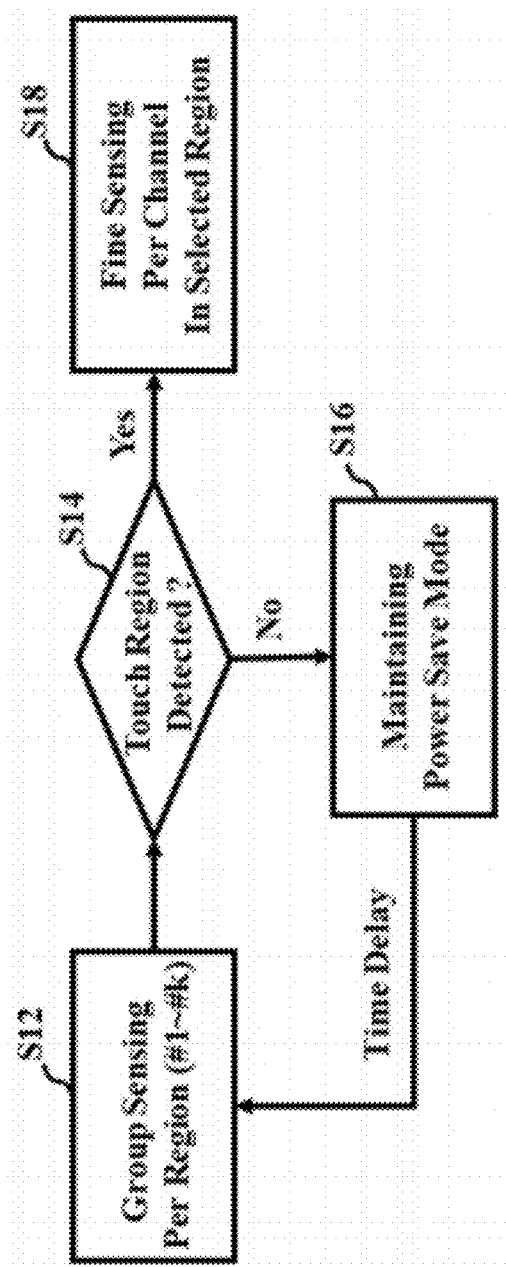
FIG. 9 is a flow chart showing a method of driving the touch controller according to another embodiment of the present invention in a power save mode.

FIG. 9 is a flow chart showing a method of driving the touch controller according to another embodiment of the present invention in a power save mode.

At Step 12 (S12), as shown in FIG. 8, the touch controller 130 divides the touch sensor 20 into k regions #1 to #k and periodically performs per-region group scanning and group sensing. At Step 14 (S14), the touch controller 130 determines whether touch has been made per region.

If no touch region has been detected at Step 14 (S14), the touch controller 130 is maintained in a power save mode at Step 16 (S16). After the lapse of a predetermined time, the touch controller 130 repeats Step 12 (S12) and Step (S14) to determine whether touch has been made per region through per-region group scanning and group sensing.

If a touch region has been detected at Step 14 (S14), the touch controller 130 selects the touch region, performs per-channel scanning and per-channel sensing only in the selected region to calculate a touch point, and outputs coordinate information of the calculated touch point to the host computer 50 at Step 18 (S18). When the touch information from the touch controller 130 is input to the host computer 50, the host computer 50 performs switching from the power save mode to a sensing mode so that the touch controller 130 is driven in the sensing mode.

In the apparatus and method for driving the touch sensor according to the present invention as described above, the touch sensor is divided into a plurality of regions in a power save mode, and it is periodically determined whether touch has been made per region through per-region group scanning and group sensing, thereby reducing touch sensor drive time and touch algorithm calculation time as compared with a conventional case in which the entire region is scanned and sensed per channel, and therefore, further decreasing power consumption.

Also, in the apparatus and method for driving the touch sensor according to the present invention, only a region in which touch has been made is selected in the power save mode, and it is determined whether touch has been made per channel with respect to only the selected region through per-channel scanning and sensing, thereby reducing touch sensor drive time and touch algorithm calculation time as compared with a conventional case in which the entire region is scanned and sensed per channel, and therefore, further decreasing power consumption.

As is apparent from the above description, in the apparatus and method for driving the touch sensor according to the present invention, the touch sensor is divided into a plurality of regions before a touch point is generated, and it is periodically determined whether touch has been made per region using a self-capacitance or mutual-capacitance sensing method as a per-region group sensing method. Also, in the apparatus and method for driving the touch sensor according to the present invention, when touch is made, a region in which the touch has been made is selected, and it is determined whether touch has been made per channel only in the selected region using a per-channel mutual-capacitance sensing method.

In the apparatus and method for driving the touch sensor according to the present invention, therefore, a group sensing method with respect to the entire region or a local channel sensing method with respect to a touch region is used depending upon whether touch is made, thereby reducing touch sensor drive time and touch algorithm calculation time as compared with a conventional case in which the entire region is scanned and sensed per channel irrespective of whether touch is made, and therefore, further decreasing power consumption.

Also, in the apparatus and method for driving the touch sensor according to the present invention, the touch sensor is divided into a plurality of regions in a power save mode, and it is periodically determined whether touch has been made per region through per-region group scanning and group sensing, thereby reducing touch sensor drive time and touch algorithm calculation time as compared with a conventional case in which the entire region is scanned and sensed per channel, and therefore, further decreasing power consumption.

Also, in the apparatus and method for driving the touch sensor according to the present invention, only a region in which touch has been made is selected in the power save mode, and it is determined whether touch has been made per channel with respect to only the selected region through per-channel scanning and sensing, thereby reducing touch sensor drive time and touch algorithm calculation time as compared with a conventional case in which the entire region is scanned and sensed per channel, and therefore, further decreasing power consumption.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for driving a touch sensor comprising a plurality of first conduction lines and a plurality of second conduction lines, the apparatus comprising a touch controller to divide the touch sensor into a plurality of regions, to periodically sense whether touch has been made per region using a group sensing mode, to select a touch region when the touch region is detected, and to sense whether touch has been made per channel using a channel sensing mode only in the selected region, wherein the touch controller uses a group self-sensing mode in which the first conduction lines and second conduction lines are grouped per region to sense self-capacitance variation per region or a group mutual sensing mode to sense mutual-capacitance variation per region as the group sensing mode, and the touch controller uses a channel mutual sensing mode to sense mutual-capacitance variation per channel in the selected region as the channel sensing mode in the selected region, wherein the touch controller comprises:

a first self mode block to drive the first conduction lines in the group self-sensing mode;

a first mutual mode block to drive the first conduction lines in the group mutual sensing mode and in the channel mutual sensing mode in the selected region;

a first mode switching block to connect the first self mode block or the first mutual mode block to the first conduction lines according to the sensing mode;

a second self mode block to drive the second conduction lines in the group self-sensing mode;

a second mutual mode block to drive the second conduction lines in the group mutual sensing mode and in the channel mutual sensing mode in the selected region;

a second mode switching block to connect the second self mode block or the second mutual mode block to the second conduction lines according to the sensing mode; and a microcontroller unit to control the first and second self mode blocks, the first and second mutual mode blocks and the first and second mode switching blocks, wherein, when the group sensing mode, the first mode switching block selects one of the first self mode block and the first mutual mode block and the second mode switching block selects one of the second self mode block and the second mutual mode block according to whether the group sensing mode is one of the group self-sensing mode and group mutual sensing mode.

2. The apparatus according to claim 1, wherein the first self mode block comprises:

a first drive signal generator to generate and output signals to drive the first conduction lines;

a first grouping switch block to group the first conduction lines connected through the first mode switching block per region according to group self-sensing mode control of the microcontroller unit; and a first self-sensing unit connected to an output line of the first drive signal generator via a feedback line to sense self-capacitance variation of the first conduction lines grouped per region.

3. The apparatus according to claim 2, wherein the second self mode block comprises:

a second drive signal generator to generate and output signals to drive the second conduction lines;

a second grouping switch block to group the second conduction lines connected through the second mode switching block per region according to group self-sensing mode control of the microcontroller unit; and a second self-sensing unit connected to an output line of the second drive signal generator via a feedback line to sense self-capacitance variation of the second conduction lines grouped per region.

4. The apparatus according to claim 3, wherein the first mutual mode block comprises:

a third drive signal generator to generate and output signals to drive the first conduction lines;

a first channel switching block connected in common to the third drive signal generator and connected to the first conduction lines connected through the first mode switching block per channel to selectively switch the drive signals per channel according to the group mutual mode or channel mutual mode control of the microcontroller unit;

a third grouping switch block connected between the first channel switching block and the first mode switching block to group the first conduction lines connected through the first mode switching block per region according to the group mutual mode control of the microcontroller unit;

a first mutual sensing unit to sense mutual-capacitance variation of the first conduction lines grouped per region; and a first transmitting and receiving switching block connected between the third drive signal generator and the first channel switching block and between the first mutual sensing unit and the first channel switching block to connect an end of the first channel switching block to an output end of the third drive signal generator or to an input end of the first mutual sensing unit according to transmitting and receiving mode control of the microcontroller unit.

5. The apparatus according to claim 4, wherein the second mutual mode block comprises:

a fourth drive signal generator to generate and output signals to drive the second conduction lines;

a second channel switching block connected in common to the fourth drive signal generator and connected to the second conduction lines connected through the second mode switching block per channel to switch the drive signals per channel according to the group mutual mode or channel mutual mode control of the microcontroller unit;

a fourth grouping switch block connected between the second channel switching block and the second mode switching block to group the second conduction lines connected through the second mode switching block per region according to the group mutual mode control of the microcontroller unit;

a second mutual sensing unit to sense mutual-capacitance variation of the second conduction lines grouped per region; and a second transmitting and receiving switching block connected between the fourth drive signal generator and the second channel switching block and between the second mutual sensing unit and the second channel switching block to connect an end of the second channel switching block to an output end of the fourth drive signal generator or to an input end of the second mutual sensing unit according to transmitting and receiving mode control of the microcontroller unit.

* * * * *